No. 895,821. PATENTED AUG. 11, 1908.
G. WILMOT, Jr.
TIRE ARMOR.
APPLICATION FILED SEPT. 16, 1907.
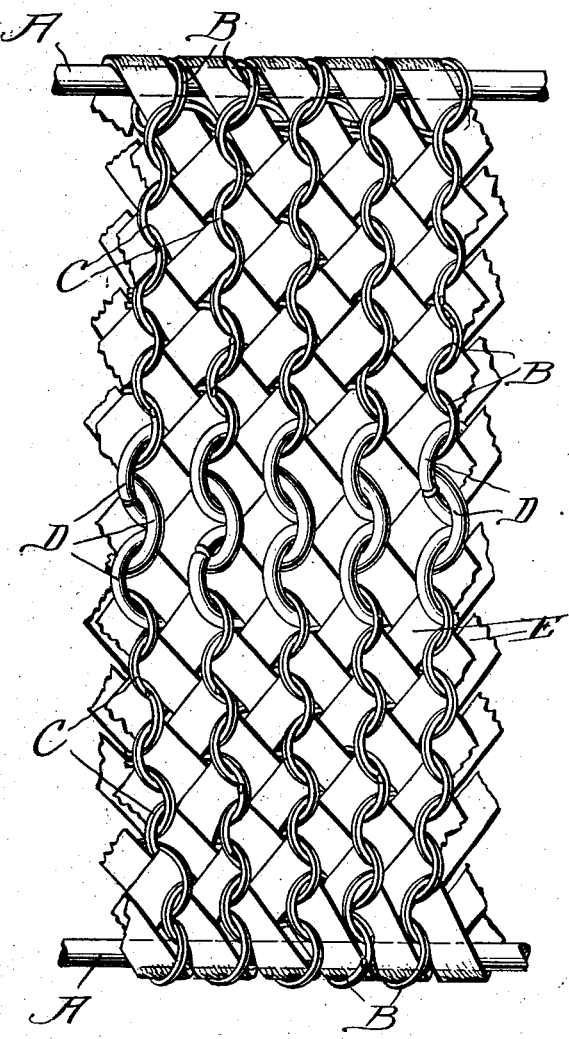
Witnesses
Inventor
George Wilmot, Jr.

UNITED STATES PATENT OFFICE.

GEORGE WILMOT, JR., OF DETROIT, MICHIGAN.

TIRE-ARMOR.

No. 895,821.	Specification of Letters Patent.	Patented Aug. 11, 1908.

Application filed September 16, 1907. Serial No. 393,201.

*To all whom it may concern:*

Be it known that I, GEORGE WILMOT, Jr., a citizen of the United States, residing at Detroit, in the county of Wayne and State of Michigan, have invented a new and useful Improvement in Tire-Armors, of which the following is a specification.

This invention is an improvement upon the tire armor shown and described by me in application for patent, filed December 22, 1906, and given Serial Number 349,096.

This invention consists of an armor formed of parallel rods supporting interlaced thongs and also carrying a plurality of transversely arranged chains, each chain consisting of a plurality of metal rings, the central rings of each chain being larger and heavier than the rings forming the end portion.

In the accompanying drawing I have shown a plan view of a portion of a tire armor.

In this drawing, A represents the metal rods which it will be well understood are bent to form rings to be secured upon the rims of the wheel over the tire of which the armor is to stretch.

To each of the rods A are secured short chain sections C, formed of a plurality of interlocking rings, the opposite ends of which engage rings B, held upon the rods A. The inner end portions of the chain C are connected by a central chain section D, preferably consisting of three comparatively large and heavy metal rings whereby a tread section of the tire is formed which consists of a portion of the interlaced thongs E, and of heavy ring chains arranged transverse to the tread of the wire and secured at each end to similar chains of less weight.

It will be understood that the thongs E are faced to form a net work and are also passed through or interlaced with the ring of both the chains C and D.

What I claim is:—

1. In an armor for automobile tires, a tread section consisting of a net work of interlaced thongs and transversely arranged chains of heavy rings, said chains being parallel to each other and the thongs being interlaced with the rings of the chains.

2. An armor for automobile tires consisting of a net of interlaced thongs, and transversely arranged chains with which said thongs are interlaced, said chains being arranged transversely to the tread portion of the armor and that portion of each chain lying across said tread portion being formed of heavier rings than the remaining portion of the chains.

GEORGE WILMOT, JR.

Witnesses:
WILLIAM J. CLARK,
JOSEPH BLAND.